(12) United States Patent
Atake et al.

(10) Patent No.: US 8,535,788 B2
(45) Date of Patent: Sep. 17, 2013

(54) TRANSFER DECORATIVE SHEET, PROCESS FOR PRODUCING DECORATED MOLDED PRODUCT, AND DECORATED MOLDED PRODUCT

(75) Inventors: Hiroyuki Atake, Tokyo (JP); Yoshiyuki Meiki, Shinjuku-ku (JP)

(73) Assignee: DAI Nippon Printing Co., Ltd., Tokyo (JP)

( * ) Notice: Subject to any disclaimer, the term of this patent is extended or adjusted under 35 U.S.C. 154(b) by 669 days.

(21) Appl. No.: 12/529,721

(22) PCT Filed: Mar. 26, 2008

(86) PCT No.: PCT/JP2008/055718
§ 371 (c)(1),
(2), (4) Date: Sep. 3, 2009

(87) PCT Pub. No.: WO2008/120633
PCT Pub. Date: Oct. 9, 2008

(65) Prior Publication Data
US 2010/0062218 A1    Mar. 11, 2010

(30) Foreign Application Priority Data
Mar. 30, 2007    (JP) .................................. 2007-095117

(51) Int. Cl.
*B32B 3/00*    (2006.01)

(52) U.S. Cl.
USPC ........ 428/195.1; 428/200; 428/201; 428/202; 428/206; 428/208; 428/343; 428/353; 428/914

(58) Field of Classification Search
USPC ................... 428/195.1–211.1, 914, 200, 201, 428/202, 206, 208, 343, 353
See application file for complete search history.

(56) References Cited

U.S. PATENT DOCUMENTS

| | | | | | |
|---|---|---|---|---|---|
| 5,795,527 | A | * | 8/1998 | Nakamura et al. | 264/267 |
| 6,017,622 | A | * | 1/2000 | Atake | 428/32.63 |
| 2002/0157772 | A1 | * | 10/2002 | Enlow et al. | 156/238 |
| 2007/0116929 | A1 | * | 5/2007 | Fujimori et al. | 428/156 |
| 2007/0202297 | A1 | * | 8/2007 | Takada et al. | 428/141 |
| 2007/0202301 | A1 | * | 8/2007 | Taniwaki et al. | 428/143 |

FOREIGN PATENT DOCUMENTS

| | | |
|---|---|---|
| EP | 1 340 622 A2 | 9/2003 |
| EP | 1 340 622 A3 | 9/2003 |
| JP | 50 19132 | 7/1975 |
| JP | 61 17255 | 5/1986 |

(Continued)

OTHER PUBLICATIONS

Machine translation of JP 2001-113888.*
Machine translation of JP 2006-198911.*
Japanese Office Action issued Nov. 29, 2011 in patent application No. JP2007-095117.

(Continued)

*Primary Examiner* — Mark Ruthkosky
*Assistant Examiner* — Christopher Polley
(74) *Attorney, Agent, or Firm* — Oblon, Spivak, McClelland, Maier & Neustadt, L.L.P.

(57) ABSTRACT

Provided is a transfer decorative sheet comprising a base film and at least a peel layer provided on one surface thereof, wherein a surface of the base film at a peel layer side is subjected to release treatment, and the other surface of the base film brought into contact with a metal die has an average surface roughness Ra of 0.08 μm or more.

A transfer decorative sheet which does not produce wrinkles on an injected molding can be provided.

18 Claims, 1 Drawing Sheet

(56) References Cited

FOREIGN PATENT DOCUMENTS

| | | |
|---|---|---|
| JP | 4-115944 | 4/1992 |
| JP | 07-237283 | 9/1995 |
| JP | 10-291217 | 11/1998 |
| JP | 2001 113888 | 4/2001 |
| JP | 2002 103387 | 4/2002 |
| JP | 2006 198911 | 8/2006 |
| JP | 2006-264135 | 10/2006 |
| JP | 2008-12744 | 1/2008 |

OTHER PUBLICATIONS

Extended European Search Report issued Nov. 30, 2012, in Application No. / Patent No. 08738906.0-1253 / 2133201 PCT/JP2008055718.

Japanese Office Action issued Jun. 5, 2012, in Patent Application No. 2007-095117.

Taiwan Office Action dated May 8, 2013 issued in Taiwan Patent Application No. 20080111160, 7 pp.

* cited by examiner

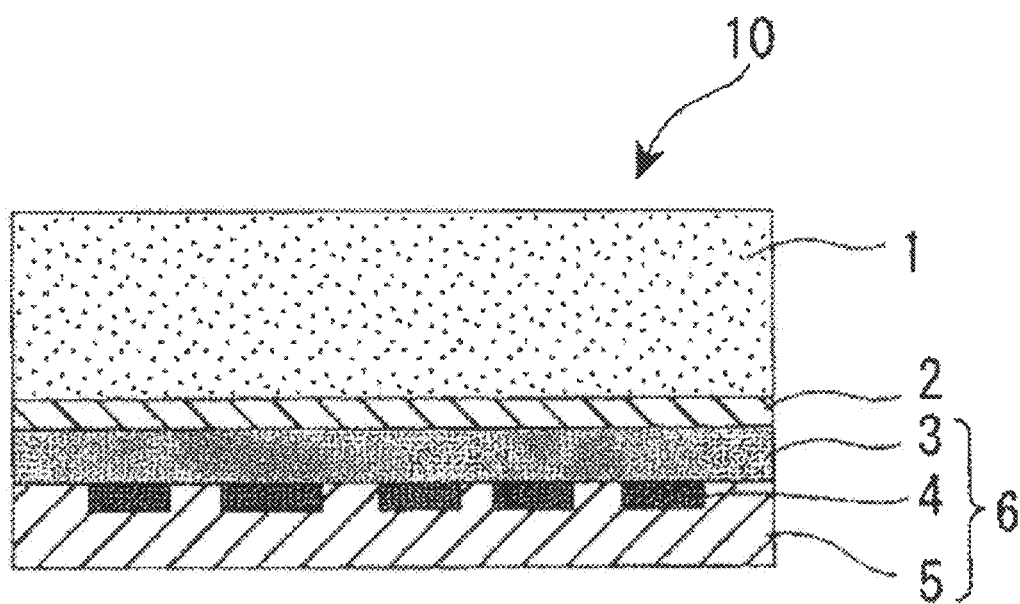

TRANSFER DECORATIVE SHEET, PROCESS FOR PRODUCING DECORATED MOLDED PRODUCT, AND DECORATED MOLDED PRODUCT

BACKGROUND OF THE INVENTION

The present invention relates to a transfer decorative sheet, a process for producing a decorated molding by using the above transfer decorative sheet and a decorated molding obtained by the above process.

RELATED ART

A decorating injection molding method is known as a decorating method for resin moldings having a complicated surface form such as a three-dimensional curved surface and the like (refer to, for example, a patent document 1 and a patent document 2). The decorating injection molding method is a method in which a decorative sheet inserted into a metal die in injection molding is integrated with a molten resin which is injected and filled into a cavity to decorate the surface of a resin molding.

The above decorating injection molding method can be classified roughly into a laminate decorating method and a transfer decorating method. In the laminate decorating method, the whole layers of a decorative sheet comprising a base film and a decorative layer provided thereon are laminated on and integrated with the surface of a resin molding. On the other hand, in the transfer decorating method, a base film is peeled and removed from a decorative sheet which is laminated on and integrated with the surface of a resin molding, and only the transferred layers such as the decorative layer and the like remain on the resin molding and are laminated.

The laminate decorating method is excellent in terms of displaying a function to protect the transferred layers since the base film of the decorative sheet remains on the surface of the resin molding, but surplus parts have to be trimmed. On the other hand, the transfer decorating method has the merit that trimming is unnecessary since the base film is peeled after transferring. The above methods are used properly according to the uses.

In the laminate decorating method, a surface protected decorative sheet (laminate sheet) is used as the decorative sheet, and the base film is required to have a transparency since it remains on the outermost surface of the resin molding. Further, it is required to have a moldability, and therefore usually an acryl resin film is suitably used.

On the other hand, in the transfer decorating method, a transfer decorative sheet is used as the decorative sheet, and the base film is required to have a peeling property in addition to a moldability.

Meanwhile, in the decorating injection molding method, plural gates are usually provided in a male die, and a resin staying in a fluid state (molten resin) is injected into a cavity through the above gates. Plural flows of the molten resin corresponding to the number of the gates are produced in the cavity, and hairy lines (unevenness) called a weld line are formed at a part where the above flows join. Wrinkles are liable to be produced on the above weld lines in the decorative sheet, and particularly when using a transfer decorative sheet, this matter is notably exhibited.

In the decorating injection molding method, it is impossible to prevent weld lines themselves from appearing, and a decorating injection molding apparatus has been improved and precisely controlled in injection molding so that wrinkles are not formed on the weld lines (refer to a patent document 3).

Patent document 1: Japanese Patent Publication No. 19132/1975
Patent document 2: Japanese Patent Publication No. 17255/1986
Patent document 3: Japanese Patent Application Laid-Open No. 103387/2002

DISCLOSURE OF THE INVENTION

In light of the situation described above, the present invention provides a transfer decorative sheet which does not form wrinkles on an injected molding without improving a decorating injection molding apparatus and requiring a specific skill, a process for producing a decorated molding by using the above transfer decorative sheet and a decorated molding.

Intensive researches repeated by the present inventors in order to achieve the object described above have resulted in finding that the object can be achieved by controlling a surface roughness of a base film brought into contact with a metal die in a transfer decorative sheet to a fixed value or higher. The present invention has been completed based the above knowledge.

That is, the present invention provides the following items.
(1) A transfer decorative sheet comprising a base film and at least a peel layer provided on one surface thereof, wherein a surface of the base film at a peel layer side is subjected to release treatment, and the other surface of the base film brought into contact with a metal die has an average surface roughness Ra of 0.08 μm or more.
(2) The transfer decorative sheet as described in the above item (1), wherein the average surface roughness is 0.08 to 1 μm.
(3) The transfer decorative sheet as described in the above item (1) or (2), wherein the surface brought into contact with the metal die is coated with a resin composition containing a matting agent.
(4) The transfer decorative sheet as described in any of the above items (1) to (3), wherein the release treatment is carried out by providing a release layer on the base film.
(5) The transfer decorative sheet as described in any of the above items (1) to (4), wherein a picture layer and an adhesive layer are further provided on the peel layer.
(6) A decorating injection molding method carried out by using the transfer decorative sheet as described in any of the above items (1) to (5), comprising (A) a step of disposing the transfer decorative sheet in an injection molding metal die, (B) a step of injecting a molten resin into a cavity and cooling and solidifying the resin to carry out resin molding and adhering of the transfer decorative sheet at the same time and (C) a step of peeling the base film.
(7) The decorating injection molding method as described in the above item (6), wherein (D) a step of bringing the transfer decorative sheet into tight contact with the metal die by vacuum molding is further provided between the step (A) and the step (B).
(8) A decorated molding obtained by the method as described in the above item (6) or (7).
(9) The decorated molding as described in the above item (8), wherein a gloss value on the surface at an incident angle of 60 degrees is 80 or more.

According to the present invention, a transfer decorative sheet which can decorate an injected molding without forming wrinkles thereon can be provided.

BRIEF DESCRIPTION OF THE DRAWINGS

FIG. 1 is a cross-sectional schematic drawing showing one example of the transfer decorative sheet of the present invention.

EXPLANATION OF THE CODES

| | |
|---|---|
| 1 | Base film |
| 2 | Release layer |
| 3 | Peel layer |
| 4 | Picture layer |
| 5 | Adhesive layer |
| 6 | Transfer layer |
| 10 | Transfer decorative sheet |

BEST MODE FOR CARRYING OUT THE INVENTION

The transfer decorative sheet of the present invention is characterized by comprising a base film and at least a peel layer provided on one surface thereof, wherein a surface of the base film at a peel layer side is subjected to release treatment, and the other surface of the base film brought into contact with a metal die has an average surface roughness Ra of 0.08 μm or more.

The typical structure of the transfer decorative sheet of the present invention shall be explained with reference to FIG. 1. FIG. 1 is a schematic drawing showing a cross section of the transfer decorative sheet 10 of the present invention. In an example shown in FIG. 1, a release layer 2, a peel layer 3, a picture layer 4 and an adhesive layer 5 are provided on a base film 1. In this case, the release layer 2 is provided for release treatment of the base film 1, and the other surface (surface of an upper part in FIG. 1) of the base film is a face brought into contact with the metal die in decorating injection molding.

Used as the base film 1 are films prepared from polyolefin base resins such as polyethylene, polypropylene and the like; vinyl base resins such as polyvinyl chloride, polyvinylidene chloride, polyvinyl alcohol, ethylene-vinyl acetate copolymers, ethylene-vinyl alcohol copolymers and the like; polyester base resins such as polyethylene terephthalate, polybutylene terephthalate and the like; acryl base resins such as polymethyl (meth)acrylate, polyethyl (meth)acrylate and the like; styrene base resins such as polystyrene and the like, acrylonitrile-butadiene-styrene copolymers, cellulose triacetate, cellophane, polycarbonate, elastomer base resins such as polyurethane and the like. Among them, the polyester base resins, particularly polyethylene terephthalate (hereinafter referred to as "PET") are preferred from the viewpoint that a moldability and a peeling property are good.

A thickness of the base film 1 falls in a range of preferably 25 to 150 μm, more preferably 50 to 100 μm from a moldability such as a shape followability and less liability to produce wrinkles and the viewpoint that handling is easy.

In the present invention, it is important that the surface of the base film 1 brought into contact with the metal die has an average surface roughness Ra of 0.08 μm or more. Setting the above average surface roughness to 0.08 μm or more makes it possible to obtain a transfer decorative sheet which can decorate an injected molding without forming wrinkles thereon.

The average surface roughness (Ra) in the present invention is determined according to a method described in JIS B0601-1976, and to be specific, it is measured by the following method.

Measuring Method of Average Surface Roughness (Ra):

A surface roughness meter "SE-3F" manufactured by Kosaka Laboratory Ltd. was used for the measurement. In the measurement, a central line average surface roughness was first determined on the conditions of a sensing pin diameter of 2 μm, a sensing pin load of 30 mg, a cutoff value of 0.08 mm and a measuring length of 2.5 mm. The above measurement was carried out in 12 measuring points. Among the values obtained, the maximum value and the minimum value were removed, and an average value of the ten points was determined and set as an average surface roughness (Ra).

An upper limit value of the average surface roughness (Ra) shall not specifically be restricted as long as it falls in a range in which the effects of the present invention are displayed, and it is preferably 1 μm or less. If the average surface roughness (Ra) is 1 μm or less, a high glossiness can be provided on the surface of the decorated molding without allowing an average surface roughness Ra of the surface of the base film 1 brought into contact with the metal die to exert an effect on a peel layer 3 side. To be more specific, the decorated molding in which a gloss value on a surface at an incident angle of 60 degrees is 80 or more can be obtained.

As described above, the average surface roughness (Ra) is preferably 0.08 to 1 μm, and it falls more preferably in a range of 0.1 to 0.5 μm because of the same reason.

A method for obtaining the average surface roughness (Ra) described above includes a method in which particles such as a matting agent are blended into the resin raw material constituting the base film 1 in producing the base film to thereby roughen the surface of the base film, a method in which the surface of the base film 1 is subjected to physical or chemical treatment and roughened and a method in which the surface of the base film 1 is roughened by coating thereon a resin composition containing a matting agent.

Among the above methods, the method in which a resin composition containing a matting agent is coated is preferred from the viewpoints that it does not require a specific base film and is a simple method and that Ra can be controlled.

Materials usually used as delustering agents for decorative sheets and toilet sheets can be used as the matting agent for obtaining the average surface roughness (Ra) described above. To be specific, they include inorganic or organic fillers and fine powders of silica, calcium carbonate, barium sulfate, alumina, glass balloon, polyethylene and the like, and among them, silica is particularly preferred. The shape of the matting agent is optional, and a sphere or an approximate sphere is preferred in terms of easiness in coating and the fine surface. A particle diameter of the matting agent which can be used is about 0.1 to 10 μm.

A resin used as a matrix in the resin composition containing the matting agent includes acryl base resins, acryl urethane base resins, polyester base resins, polyolefin base resins, vinyl chloride-vinyl acetate copolymers and the like. Among them, the acryl base resins are preferred in terms of elongation in heating and an adhesive property to the base film.

The coating method shall not specifically be restricted and includes a gravure coating method, a roll coating method, a spray coating method and the like.

A method for roughening by carrying out the physical or chemical treatment described above includes an oxidation method such as corona discharge treatment, chromium oxidation treatment, flame treatment, hot air treatment, ozone-UV ray treatment and the like in addition to a sand blast method and a solvent treating method.

In the base film 1 in the transfer decorative sheet of the present invention, a surface thereof at a peel layer 3 side is subjected to release treatment. A method for the release treatment includes various methods, and a method in which the release layer 2 is formed on the surface of the base film 1 is preferred since it can easily be carried out without using a specific base film.

The release layer 2 described above can be formed by coating and drying a release agent, and a method for coating the release agent shall not specifically be restricted and includes a gravure coating method, a roll coating method, a spray coating method and the like.

Capable of being used as the release agent are melamine resin base release agents, silicone resin base release agents, fluororesin base release agents, cellulose resin base release agents, urea resin base release agents, polyolefin resin base release agents, paraffin resin base release agents, acryl resin base release agents, complex type release agents thereof and the like. Among them, the acryl resin base release agents and the polyolefin resin base release agents are preferred, and release agents obtained by combining them such as acryl-polyethylene base release agents are particularly preferred.

The peel layer 3 in the transfer decorative sheet of the present invention is a layer which becomes an outermost layer in peeling the base film 1 and the release layer 2 after decorating injection molding to protect the molding and the picture layer from light, chemicals and abrasion. Accordingly, the peel layer is preferably excellent in surface physical properties such as an abrasion resistance, a chemical resistance, a stain resistance and the like. To be specific, acryl base resins and urethane base resins are suitably used. Further, thermosetting resin compositions and ionizing radiation-curable resin compositions can also be used as the other resins.

Phenol resins, phenol-formalin resins, urea resins, urea-formalin resins, melamine resins, melamine-formalin resins, alkyd resins, epoxy resins, unsaturated polyester resins, general purpose two liquid-curable type acryl resins (acryl polyol cured matters) and the like can be shown as the examples of the thermosetting resin compositions.

The ionizing radiation-curable resin compositions mean resin compositions which are cross-linked and cured by irradiating with rays having an energy quantum capable of cross-linking and curing molecules among electromagnetic waves and charged particle beams, that is, a UV ray or an electron beam. To be specific, materials suitably selected from polymerizable monomers and polymerizable oligomers or prepolymers which have so far conventionally been used as ionizing radiation-curable resin compositions can be used.

When a UV ray-curable resin composition is used as the ionizing radiation-curable resin composition, a photopolymerization initiator is preferably added in an amount of 0.1 to 5 weight parts per 100 weight parts of the resin composition.

Further, a UV ray absorber is preferably contained in the resin composition constituting the peel layer 3. The decorated molding can be provided with a weatherability by containing the UV ray absorber. To be specific, it includes a salicylic acid base, a benzophenone base, a benzotriazole base, a cyanoacrylate base, a triazine base and the like. A content of the UV ray absorber is 0.1 to 30 weight % based on the resin composition constituting the peel layer 3.

Further, a polyethylene wax may be added to the resin composition constituting the peel layer 3 in order to provide the surface with a scratching resistance. A content of the polyethylene wax is 0.1 to 20 weight % based on the resin composition constituting the peel layer 3.

A method for forming the peel layer 3 shall not specifically be restricted and includes a gravure coating method, a roll coating method, a spray coating method and the like. After coated by the method described above, the coated layer is air-dried or dried at a temperature of 100° C. or lower for 10 seconds or shorter to vaporize the solvent. The above conditions are preferred since the base film does not shrink.

A thickness of the peel layer 3 is preferably 0.5 to 30 μm. If it is 0.5 μm or more, satisfactory surface physical properties such as an abrasion resistance, a chemical resistance and the like are obtained. If it is 30 μm or less, the moldability such as the form followability and the like is obtained, and it is advantageous from an economical point of view. From the viewpoint described above, a thickness of the peel layer 3 falls more preferably in a range of 1 to 10 μm.

A UV ray, an electron beam, a γ ray and the like can be given as the ionizing radiation described above.

An energy resource in the case of a UV ray includes, for example, UV ray lamps such as a low pressure mercury lamp, a high pressure mercury lamp, a metal halide lamp, an electrodeless discharge lamp, a xenon lamp, an excimer lamp and the like. The irradiation dose is preferably 50 to 10000 $mJ/cm^2$.

In the case of an electron beam, various electron beam accelerators of, for example, a Cockroft-Walton type, a Van de Graaff type, a resonance transformer type, an insulating core transformer type, a linear type, a dynamitron type, a high frequency type and the like can be used as an electron beam resource. An acceleration voltage thereof can suitably be selected according to the resin used and a thickness of the layer. The acceleration voltage is usually 70 to 300 kV, and the irradiation dose is preferably an amount in which a cross-linking density of the resin layer is saturated and is selected in a range of usually 5 to 300 kGy (0.5 to 30 Mrad), preferably 10 to 50 kGy (1 to 5 Mrad).

Next, the picture layer 4 is a layer provided for imparting the decorated molding with a designing property. The picture layer 4 can be formed by printing with a colored ink and the like comprising a resin such as a polyvinyl base resin, a polyamide base resin, a polyester base resin, an acryl base resin, a polyurethane base resin, a polyvinyl acetal base resin, a cellulose base resin, an alkyd base resin or the like as a binder and a pigment or a dye of a suited color as a colorant.

A method for printing shall not specifically be restricted and includes, for example, an offset printing method, a gravure printing method, a screen printing method and the like.

The adhesive layer 5 is provided for adhering the transfer decorative sheet 10 of the present invention on the surface of the molding. A thermosensitive or pressure-sensitive resin which is suited to a material for the molding is suitably used for the adhesive layer 5. When the material for the molding is, for example, an acryl base resin, an acryl base resin is preferably used for the adhesive layer. When the material for the molding is a polyphenylene oxide-polystyrene base resin, a polycarbonate base resin or a styrene base resin, an acryl base resin, a polystyrene base resin, a polyamide base resin and the like which have a compatibility with the above resins are preferably used. Further, when the material for the molding is a polypropylene resin, a chlorinated polyolefin resin, a chlorinated ethylene-vinyl acetate copolymer resin, a cyclic rubber and a coumarone indene resin are preferably used.

A method for forming the adhesive layer 5 includes a coating method such as a gravure coating method, a roll coating method and the like and a printing method such as a gravure printing method, a screen printing method and the like. When the peel layer 3 and the picture layer 4 have a satisfactory adhesive property to the molding, the adhesive layer 5 may not be provided A production process for the decorated molding according to the present invention is carried out by a decorating injection molding method in which the transfer decorative sheet of the present invention is used, and it comprises (A) a step of disposing the transfer decorative sheet in an injection molding metal die, (B) a step of injecting a molten resin into a cavity and cooling and solidifying the resin to carry out resin molding and adhering of the transfer decorative sheet at the same time and (C) a step of peeling the base film.

The step (A) is a step of disposing the transfer decorative sheet 10 of the present invention in a molding metal die and inserting it. To be specific, the transfer decorative sheet 10 of the present invention is fed into the molding metal die comprising a movable die and a fixed die with the transfer layer 6 turned to the inside, that is, so that the base film 1 is brought into contact with the fixed die. In this case, the single transfer decorative sheet may be fed one by one, or the required parts of the long transfer decorative sheet may intermittently be fed.

Next, the step (B) is a step of injecting a molten resin into a cavity and cooling and solidifying the resin to carry out resin molding and adhering of the transfer decorative sheet at the same time. Usually, the molten resin is injected from a gate provided in the movable die, and the transfer decorative sheet is adhered on the surface of a molding at the same time as the molding is formed.

A thermoplastic resin or a thermosetting resin which can be injection-molded can be used as a resin material which can be used in the above step. Capable of being used are, for example, polystyrene base resins, polyolefin base resins, ABS resins (including heat resistant ABS resins), AS resins, AN resins, polyphenylene oxide base resins, polycarbonate base resins, polyacetal base resins, acryl base resins, polyethylene terephthalate base resins, polybutylene terephthalate base resins, polysulfone base resins, polyphenylene sulfide base resins and the like.

(D) a step of bringing the transfer decorative sheet into tight contact with the metal die by vacuum molding is preferably further provided between the step (A) and the step (B). This step is called usually preliminary molding, and after disposing the transfer decorative sheet in a prescribed position, it is softened by heating usually at 80 to 150° C. and vacuumed, whereby the above sheet is brought into tight contact with the surface of the molding metal die.

Next, after cooled, the molding metal die is opened to take out the decorated molding having the transfer decorative sheet adhered thereon from the metal die, and the base film is peeled therefrom (step (C)). The base film 1 has been subjected to release treatment by providing the release layer 2, and therefore it can readily be peeled at a boundary surface between the release layer 2 and the peel layer 3. Thus, the transfer decorative sheet of the present invention makes it possible to easily produce a decorated molding which is free from wrinkles and has an excellent appearance and which has a weatherability, an abrasion resistance and a chemical resistance

EXAMPLES

Next, the present invention shall be explained in further details with reference to examples, but the present invention shall by no means be restricted by these examples.

Evaluation Methods:

Transfer decorative sheets obtained in the examples and the comparative examples were evaluated by the following methods.

(1) Average Surface Roughness

Measured according to the method described in the present specification.

(2) Production of Decorated Molding by Decorating Injection Molding

The transfer decorative sheets obtained in the respective examples and comparative examples were disposed in a metal die to carry out preliminary molding. Then, the die was closed, and a heat resistant ABS resin ("MTH" manufactured by Nippon A & L Inc.) was injected thereinto. The resin was injected from two gates at a metal die temperature of 60° C. and an injected resin temperature of 230° C. Then, the resin was cooled and solidified, and a situation in which wrinkles were produced in the decorated molding thus obtained was visually confirmed.

(3) Evaluation of Gloss

A gloss meter ("GMX-203" manufactured by Murakami Color Research Laboratory Co., Ltd.) was used to measure a gloss value on the surface of the decorated molding on the condition of an incident angle of 60 degrees. It is shown that the higher the numeral is, the higher the gloss is (high gloss), and it is shown that the lower the numeral is, the lower the gloss is (low gloss).

Example 1

A release layer constituted from an acryl-ethylene base resin was formed on one surface of a moldable PET film (PET film stretched by heating) having a thickness of 75 μm which was a base film. An acryl resin composition in which silica particles (matting agent) having an average particle diameter of 1.5 μm were added in an amount of 6 weight % based on the acryl resin was coated in a layer thickness of 2 μm by gravure printing on a surface opposite to the surface on which the release layer was formed. Then, a peel layer comprising an acryl base resin, a picture layer and an adhesive layer were coated on the release layer described above to obtain a transfer decorative sheet. The thicknesses of the respective layers were 3 μm, 2 μm and 3 μm. The above transfer decorative sheet was evaluated by the methods described above. The results thereof are shown in Table 1.

Example 2

A transfer decorative sheet was obtained in the same manner as in Example 1, except that in Example 1, a content of the silica particles (matting agent) was changed to 35 weight %. The decorative sheet was evaluated in the same manner as in Example 1, and the results thereof are shown in Table 1.

Comparative Example 1

A transfer decorative sheet was obtained in the same manner as in Example 1, except that in Example 1, the surface of the base film which was brought into contact with the metal die was not subjected to the treatment. The decorative sheet was evaluated in the same manner as in Example 1, and the results thereof are shown in Table 1.

TABLE 1

| | Average surface roughness (Ra) (μm) | Appearance of decorated molding | Gloss |
|---|---|---|---|
| Example 1 | 0.2 | No wrinkles | 88 |
| Example 2 | 2 | No wrinkles | 70 |
| Comparative Example 1 | 0.04 | Wrinkles produced | 90 |

INDUSTRIAL APPLICABILITY

Use of the transfer decorative sheet of the present invention makes it possible to obtain a decorated molding which is free from wrinkles and has an excellent appearance.

What is claimed is:

1. A transfer decorative sheet comprising a base film and at least a peel layer provided on one surface thereof, wherein the surface of the base film at the peel layer side is subjected to release treatment, and an opposing surface of the base film which is brought into contact with a metal die in a production process for a decorated molding has a coating comprising a resin composition containing a matting agent, wherein said surface brought into contact with the metal die has an average surface roughness Ra of 0.08 to 2 μm, and wherein a picture layer is provided on the peel layer.

2. The transfer decorative sheet as described in claim 1, wherein the average surface roughness is 0.08 to 1 μm.

3. The transfer decorative sheet as described in claim 1, wherein the release treatment is carried out by providing a release layer on the base film.

4. The transfer decorative sheet as described in claim 1, wherein an adhesive layer are further provided on the peel layer.

5. A decorating injection molding method carried out by using the transfer decorative sheet as described in claim 1, comprising (A) disposing the transfer decorative sheet in an injection molding metal die, (B) injecting a molten resin into a cavity and cooling and solidifying the resin to carry out resin molding and adhering of the transfer decorative sheet at the same time and (C) peeling the base film.

6. The decorating injection molding method as described in claim 5, wherein (D) bringing the transfer decorative sheet into tight contact with the metal die by vacuum molding is further provided between (A) and (B).

7. A decorated molding obtained by the method as described in claim 5.

8. The decorated molding as described in claim 7, wherein a gloss value on the surface at an incident angle of 60 degrees is 80 or more.

9. The transfer decorative sheet as described in claim 1, wherein the base film is prepared from polyester based resin.

10. The transfer decorative sheet as described in claim 9, wherein the polyester based resin is polyethylene terephthalate.

11. The transfer decorative sheet as described in claim 1, wherein the particle diameter of the matting agent is 0.1 to 10 μm.

12. The transfer decorative sheet as described in claim 1, wherein the matting agent is an inorganic or organic filler.

13. The transfer decorative sheet as described in claim 1, wherein the matting agent is a fine powder of a material selected from the group consisting of silica, calcium carbonate, barium sulfate, alumina, glass balloon, and polyethylene.

14. The transfer decorative sheet as described in claim 1, wherein the matting agent is a silica fine powder.

15. The transfer decorative sheet as described in claim 1, wherein the matting agent is a sphere.

16. The transfer decorative sheet as described in claim 1, wherein the resin is an acryl base resin.

17. The transfer decorative sheet as described in claim 1, wherein the base film is prepared from a resin selected from the group consisting of a polyolefin based resin, a vinyl based resin, an acryl based resin, a styrene based resin, an acrylonitrile-butadiene-styrene copolymers, cellulose triacetate, cellophane, a polycarbonate, and an elastomer based resin.

18. The transfer decorative sheet as described in claim 1, wherein the base film has a thickness of 25 to 150 μm.

* * * * *